United States Patent [19]

Seifert, Jr.

[11] 4,105,077
[45] Aug. 8, 1978

[54] UNIVERSALLY SUPPORTED IMPLEMENT FRAME SECTION

[76] Inventor: Edwin A. Seifert, Jr., Rte. 1, Box 22, Belgrade, Mont. 59714

[21] Appl. No.: 747,593

[22] Filed: Dec. 6, 1976

Related U.S. Application Data

[63] Continuation-in-part of Ser. No. 632,687, Nov. 17, 1975, abandoned, Continuation-in-part of Ser. No. 477,320, Jun. 6, 1974, abandoned, Continuation-in-part of Ser. No. 268,782, Jul. 3, 1972, abandoned.

[51] Int. Cl.² ............................................. A01B 73/00
[52] U.S. Cl. ................................... 172/311; 172/629; 172/662
[58] Field of Search ............... 172/311, 456, 459, 474, 172/475, 476, 483, 619, 629, 631, 633, 640, 657, 662; 56/228, 385; 280/411 R, 411 A, 411 B, 411 C, 412, 413, 494, 639, 656; 111/54, 55, 57

[56] References Cited

U.S. PATENT DOCUMENTS

| | | | |
|---|---|---|---|
| 816,449 | 3/1906 | Fleming | 172/456 |
| 3,190,367 | 6/1965 | Kopaska | 172/456 |
| 3,491,836 | 1/1970 | Doepker | 172/311 |
| 3,505,704 | 4/1970 | Hornung et al. | 172/311 X |
| 3,705,560 | 12/1972 | Lappin | 172/310 X |
| 3,727,697 | 4/1973 | Wilbeck | 172/313 |

FOREIGN PATENT DOCUMENTS

945,028  11/1948  France ..................................... 172/631

Primary Examiner—Richard T. Stouffer
Attorney, Agent, or Firm—Clarence A. O'Brien; Harvey B. Jacobson

[57] ABSTRACT

A ground working implement is provided defining an intended forward path of movement and including first and second sections arranged in side-by-side relation relative to said path. The sections each include ground working elements and ground engaging support wheels. A first of the sections includes structure for attachment to a prime mover and structure is provided for coupling the first and second sections together for transferring forward thrust from the first section to the second section, limited angular displacement of the second section relative to the first section about a first horizontal axis generally normal to the path of intended movement and angular displacement of the second section at least 45° relative to the first section about a second horizontal axis generally paralleling the path of intended movement, the ground engaging support wheels carried by the first and second sections and the aforementioned structure coupling the sections together enables forward movement of both sections upon forward thrust being applied to the first section and relative "floating" displacement of the sections during their movement over the ground whereby each section may conform to the relief of the ground surface being travelled over thereby.

8 Claims, 9 Drawing Figures

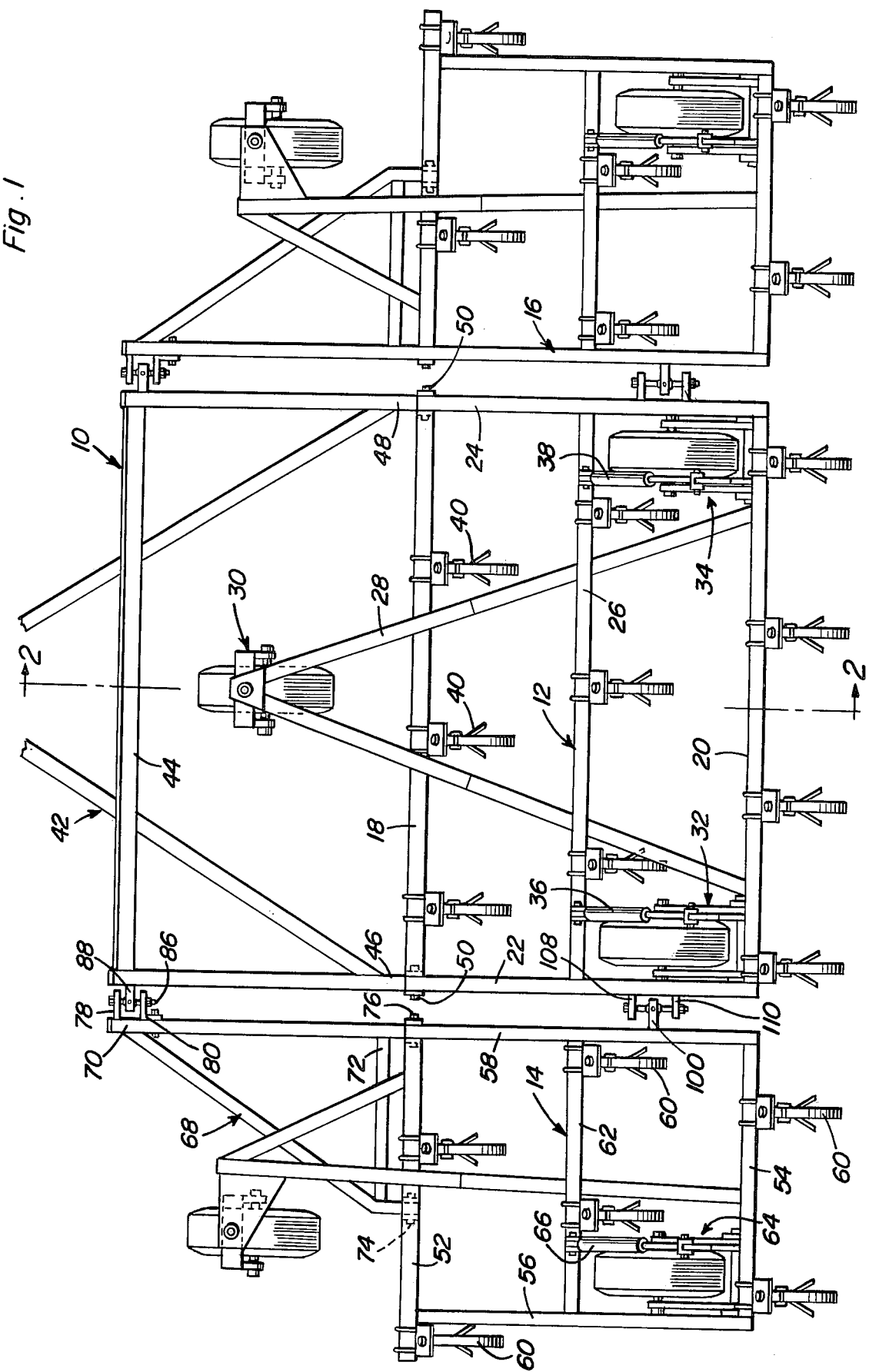

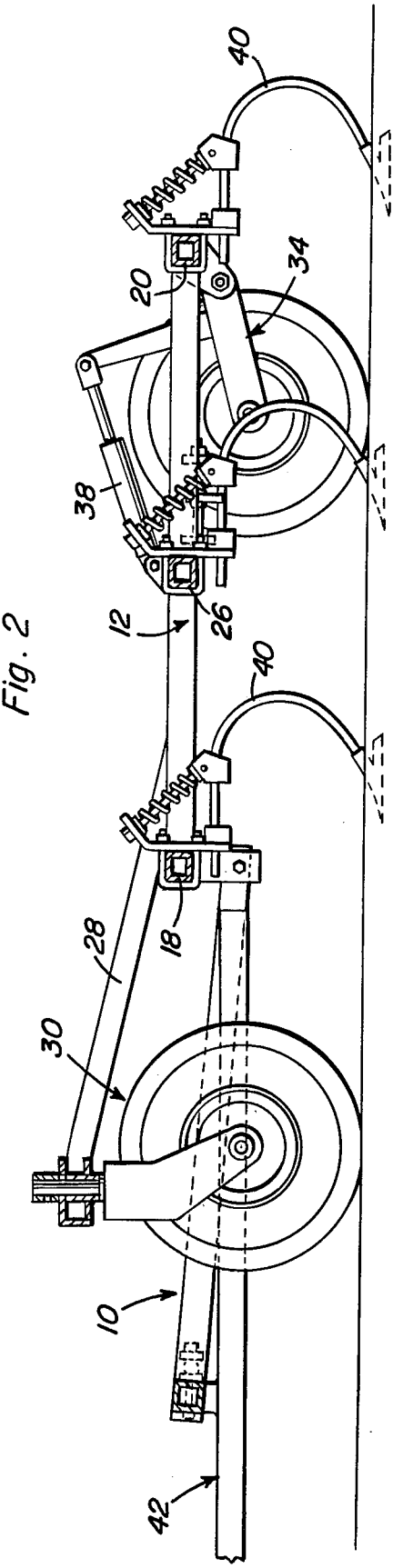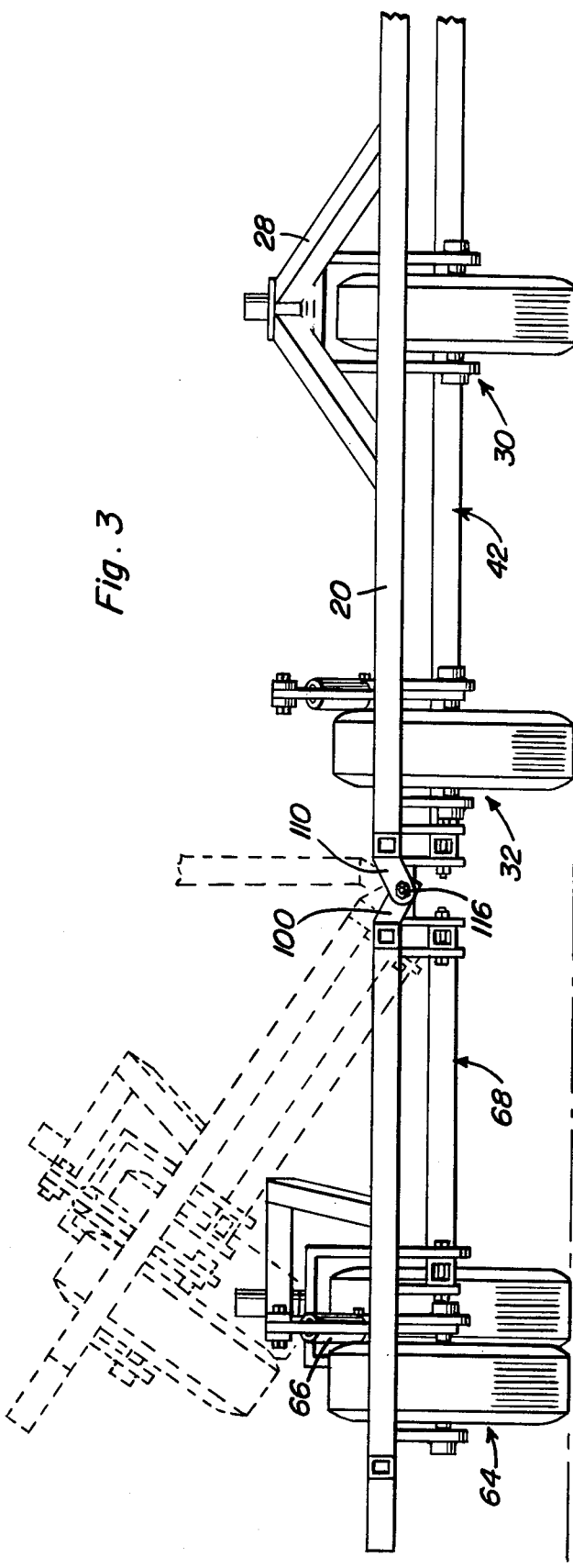

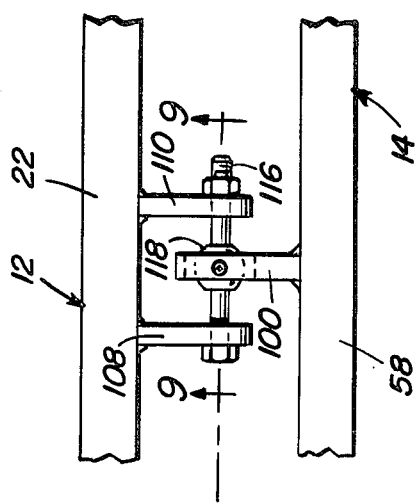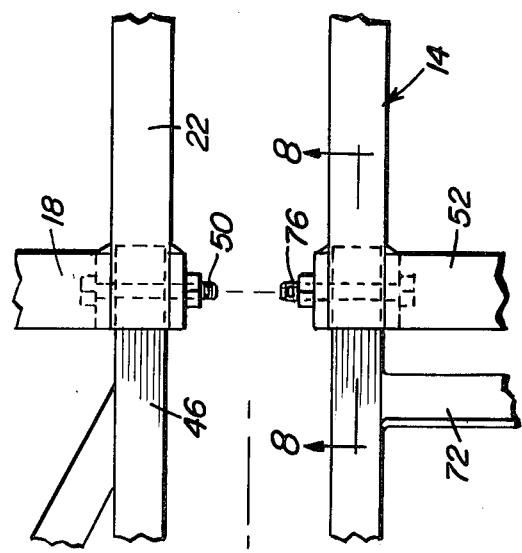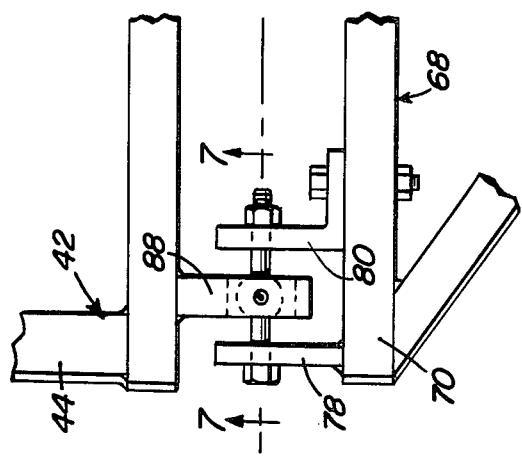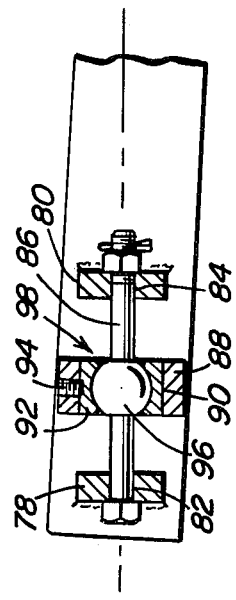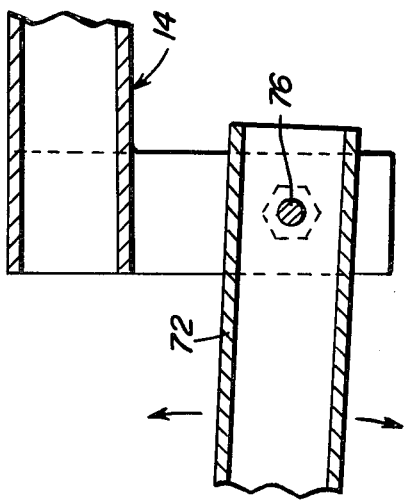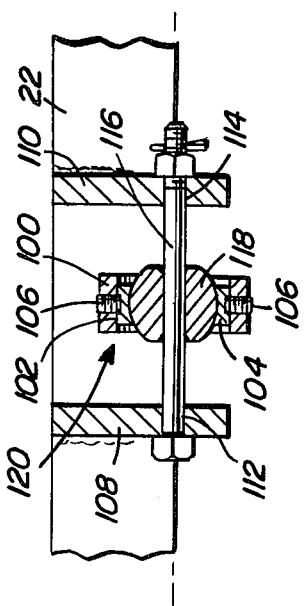

UNIVERSALLY SUPPORTED IMPLEMENT FRAME SECTION

The application comprises a continuation-in-part of my co-pending U.S. application, Ser. No. 632,687, filed Nov. 17, 1975, now abandoned, comprising a continuation-in-part of my U.S. application, Ser. No. 477,320, filed June 6, 1974, now abandoned, comprising a continuation-in-part of my U.S. application Ser. No. 268,782, filed July 3, 1972, now abandoned.

BACKGROUND OF THE INVENTION

Various forms of farm implements are constructed of a plurality of implement sections arranged in side-by-side relation to create a wider and more efficient implement working area. However, in order to obtain equal ground working operations by each of the implement sections, it is necessary that each of the sections be independently supported from the ground and that the sections be connected together in a manner to enable each section to conform to the contour or relief of the ground surface being traversed thereby. While it is possible to provide multi-section ground implements of this type including the ability for each section of the implement to be supported from the ground for independent "floating" oscillation in order to conform to the ground over which the sections are moving, wide multi-section farm implements present a problem when being transported from one field to another and along roads in that they are too wide to pass through normal width fence openings and exceed maximum width limitations which govern the width of loads which may be transported on roadways.

While some forms of wide multi-section farm implements include center sections in addition to opposite side "wing" sections which may be folded up and over the center section for ease in transport from one field to another and in order to decrease the maximum width of the implement sufficient to enable it to travel over county and state roadways, these multi-section farm implements are generally not constructed in a manner which enables the sections thereof, when in operation, to "float" relative to each other so as to conform to different ground surfaces over which the sections may pass.

BRIEF DESCRIPTION OF THE INVENTION

The farm implement of the instant invention includes a center section and a pair of opposite side sections. The opposite side sections are supported from the center section in a manner such that forward thrust applied to the center section is transferred to the side sections and the side sections may be swung upwardly and over the center section so as to reduce the overall width of the implement when travelling through fences between fields and over roads.

The main object of this invention is to provide a farm implement including a center section and upwardly swingable and retractable opposite side "wing" sections with the "wing" sections supported from the center section in a manner enabling the center and opposite side sections to "float" relative to each other when travelling over rough ground.

Another object of this invention is to provide each of the sections of the implement with its own front and rear ground engaging support wheels whereby the various depending ground engaging elements supported from the sections may at least substantially conform to the contour of the ground over which the sections are moving.

Another important object of this invention is to provide a farm implement of a type which may be utilized to support a variety of depending ground working implements.

A final object of this invention to be specifically enumerated herein is to provide a farm implement in accordance with the preceding objects and which will conform to conventional forms of manufacture, be of simple construction and easy to use so as to provide a device that will be economically feasible, long lasting and relatively trouble free in operation.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary top plan view of the farm implement of the instant invention;

FIG. 2 is an enlarged longitudinal vertical sectional view taken substantially upon the plane indicated by the section line 2—2 of FIG. 1;

FIG. 3 is a fragmentary enlarged rear elevational view of the left-hand side of the implement and with partially and substantially fully raised positions of the left side wing section of the implement illustrated in plantom lines;

FIG. 4 is an enlarged fragmentary top plan view illustrating a forward coupling assembly by which the forward end of a thrust and control arm portion of the left wing section is coupled to the forwardly projecting tongue portion of the center section;

FIG. 5 is an enlarged fragmentary top plan view illustrating the aligned axes of relative oscillation between the rear of the thrust and control arm portion and the forward portion of the left swing section and between the rear portion of the tongue portion and the forward end of the adjacent side of the center section;

FIG. 6 is a fragmentary enlarged top plan view illustrating the coupling assembly connecting the adjacent rear portions of the center and left side wing sections together;

FIG. 7 is an enlarged fragmentary longitudinal vertical sectional view taken substantially upon the plane indicated by the section line 7—7 of FIG. 4;

FIG. 8 is an enlarged fragmentary longitudinal vertical sectional view taken substantially upon the plane indicated by the sectional line 8—8 of FIG. 5; and FIG. 9 is an enlarged fragmentary longitudinal vertical sectional view taken substantially upon the plane indicated by the section line 9—9 of FIG. 6.

DETAILED DESCRIPTION OF THE INVENTION

Referring now more specifically to the drawings, the numeral 10 generally designates the farm implement of the instant invention. The implement 10 includes a center frame section referred to in general by the reference numeral 12 and a pair of opposite side wing frame sections referred to in general by the reference numerals 14 and 16. The sections 14 and 16 are substantially identical, except that they are mirror images of each other. Further, each section 14 and 16 is coupled to the corresponding sides of the center section 10 in the same manner. Accordingly, the coupling of only the left side wing section 14 will be discussed in detail hereinafter.

The frame 12 includes front and rear transverse members 18 and 20 interconnected by means of opposite side longitudinal members 22 and 24. In addition, the frame 12 includes a third transverse member 26 extending between the opposite side members 22 and 24 intermediate the front and rear transverse members 18 and 20.

The center section 12 includes a forwardly projecting support structure 28 from which a depending caster wheel assembly referred to in general by the reference numeral 30 is supported. In addition, the opposite sides of the rear portion of the frame 12 include retractable support wheel assemblies referred to in general by the reference numerals 32 and 34 and under the control of fluid cylinders 36 and 38 operatively connected between the assemblies 32 and 34 and the transverse member 26. Further, the center section 12 includes a plurality of depending ground working elements 40 which may be spring mounted and the forward end of the section 18 includes a towing tongue structure referred to in general by the reference numeral 42 adapted to be coupled at its forward end to a draft vehicle. The towing tongue structure 42 includes an intermediate transverse member 44 and opposite side rear portions 46 and 48 pivotally secured to opposite side forward portions of the front transverse member 18 of the section 12 as at 50 for relative oscillation of the towing tongue structure 42 relative to the frame section 18 about a horizontal transverse axis disposed substantially normal to the intended forward path of movement of the implement 10.

The left side wing frame section 14 includes front and rear transverse members 52 and 54 between which opposite side longitudinal frame members 56 and 58 extend and a plurality of depending ground working elements 60 are supported from the members 52 and 54 as well as a third transverse member 62 of the frame section 14 extending between the opposite side frame members 56 and 58 intermediate the front and rear transverse members 52 and 54. Of course, the ground working elements 60 may correspond directly to the ground working elements 40 and also be spring mounted, if desired. Also, the left side wing frame section 14 includes a ground engaging support wheel assembly 64 corresponding to the wheel assemblies 34 and which is also retractable and under the control of a fluid cylinder 66 connected between the wheel assembly 64 and the transverse frame members 62.

The left side frame section 14 further includes a thrust and control arm assembly referred in general by the reference numeral 68 including a front end portion 70 and a rear end portion 72. The rear end portion 72 is pivotally connected to the front end of the frame section 14 as at 74 and 76 for relative oscillation between the assembly 68 and the section 14 about a horizontal transverse axis substantially coinciding with the axis of oscillation of the towing tongue structure 42 relative to the center or main frame section 12. The forward end portion of the assembly 68 includes a pair of braces 78 and 80 spaced longitudinally of the assembly 68 and provided with an aligned front to rear extending horizontal bore 82 and 84. A pivot fastener 86 is secured through the bores 82 and 84 and the left side of the towing tongue structure 42 includes a laterally outwardly projecting mount 88 having a front to rear extending bore 90 formed therethrough. An annular spherical bearing race 92 is secured in the bore 90 by means of a set screw 94 carried by the mount 88 and the center portion of the pivot fastener 86 includes a spherical enlargement 96 fixed thereon and rotatable and universally oscillatable in the bearing race 92. Accordingly, the coupling assembly referred to in general by the reference numeral 98 and including the components 78 through 96 couple the arm assembly 68 to the towing tongue structure 42 for transfer of forward thrust from the towing tongue structure 42 to the assembly 68, angular displacement of the assembly 68 relative to the towing tongue structure 42 about a front to rear extending horizontal axis and limited angular displacement of the assembly 68 relative to the towing tongue structure 42 about a horizontal axis extending transversely of the intended path of movement of the implement 10.

With attention invited more specifically to FIGS. 6 and 9 of the drawings, it may be seen that the rear end of the member 58 of the section 14 includes horizontally laterally outwardly projecting mount 100 which is generally similar to the mount 88 and includes a front to rear extending horizontal bore 102 formed therethrough. A spherical bearing race 104 is secured in the bore 102 by means of set screws 106 and the rear end portion of the member 22 of the frame section 12 includes a pair of front and rear outwardly projecting braces 108 and 110 having aligned front to rear extending horizontal bores 112 and 114 formed therethrough. A pivot fastener 116 is secured through the bores 112 and 114 and has a spherical bearing member 118 rotatably and slidably mounted thereon and rotatably and oscillatably captively received within the bearing race 104. Accordingly, the rear end of the frame section 14 is coupled to the corresponding rear side portion of the section 18 in generally the same manner as the forward end of the arm assembly 68 is coupled to the towing tongue structure 42. However, inasmuch as the spherical bearing member 118 is slidable on the pivot fastener 116, the frame section 14 may be forwardly and rearwardly displaced relative to the frame section 12.

In operation, when all frame sections 12, 14 and 16 are horizontally disposed they are in field operating positions and when the sections 14 and 16 are swung upwardly, at least 45° relative to the section 12, the width of the implement is substantially reduced for over the road and through fence opening transit. Each of the frame sections 12, 14 and 16 includes its own ground engaging support wheels and thus tends to conform to the contour of the ground over which it is moved. Further, the aligned pivot connections 50 and 76 and the coupling assembly 98 as well as the coupling assembly referred to in general by the reference numeral 120 and comprising the components 100 through 118 enable relative angular displacement of the sections 14, 16 and 18 about generally aligned horizontal transverse axes and also upward swinging movement of the wing frame sections 14 and 16 in order to reduce the overall width of the implement 10, partially and substantially fully raised positions of the frame section 14 being illustrated in plantom lines in FIG. 3. Further, suitable means, not shown, may be operatively connected between the center sections 12 and the wing sections 14 and 16 for controllably raising and lowering the latter and releasably retaining the same in raised positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A ground working implement defining an intended forward path of movement and including first and second horizontal frame sections arranged in side-by-side relation to said path, said sections each including ground working elements and ground engaging support wheel means, said first section including means for coupling to a prime mover, and coupling means coupling said sections together for transferring forward thrust from said first section to the second section, limited angular displacement of said second section relative to said first section about a first horizontal axis generally normal to said path when said sections are generally horizontally disposed and upward angular displacement of said second section relative to said first section about a second horizontal axis generally paralleling said path to a raised folded transport position substantially fully supported from said first section, said coupling means includes a front to rear extending arm carried by said second section having its rear end pivotally anchored to a forward portion of said second section for limited oscillation relative thereto about a third horizontal axis generally paralleling said first axis and front and rear aligned coupling structures defining said second axis and between which the latter extends, coupling the front end of said arm to a forward portion of said first section and the rear portion of said second section to a rear portion of said first section for oscillation of said arm and second section about said second axis relative to said forward and rearward portions, respectively, of said first section, said coupling structures including means operative to allow limited angular displacement of the front end of said arm relative to said first section about a fourth horizontal axis disposed generally normal to said path and limited angular displacement of the rear portion of said second section relative to said rear portion of said first section about said first axis, said rear coupling structure including means operative to allow limited front to rear shifting of said first axis relative to said first section and said front coupling structure including means for transferring forward thrust from said first section to said arm means.

2. The combination of claim 1 wherein the wheel means carried by each of said sections includes front and rear wheel means disposed forward and to the rear of, respectively, said third axis.

3. The combination of claim 2 wherein said rear wheel means are journalled for rotation about horizontal axes disposed in generally the same upstanding plane normal to said path closely adjacent said first axis.

4. The combination of claim 1 including a third section similar to said second section, disposed on the side of said first section remote from said second section and including ground engaging support wheel means and ground working elements corresponding to the first mentioned wheel means and ground working elements, and additional coupling means, corresponding to the first mentioned coupling means, coupling said third section to said first section.

5. The combination of claim 4 wherein the wheel means carried by each of said sections includes front and rear wheel means disposed forward and to the rear of, respectively, said third axis.

6. The combination of claim 5 wherein said rear wheel means are journalled for rotation about horizontal axes disposed in generally the same upstanding plane normal to said path closely adjacent said first axis.

7. The combination of claim 1 wherein said coupling means includes means operative to establish said first axis in a vertical plane normal to said path and at least closely adjacent a second vertical plane normal to said path containing the axes of rotation of corresponding wheel means of said sections.

8. The combination of claim 1 wherein said front and rear coupling structures support said arm and second section from said first section for angular displacement relative thereto about said second axis between generally horizontal positions and raised positions of said arm and second section inclined at least 45° relative to said first section.

* * * * *